United States Patent [19]

Wu

[11] Patent Number: 6,070,940
[45] Date of Patent: Jun. 6, 2000

[54] CONNECTING ARRANGEMENT FOR BACKREST, ARMREST, AND SEAT OF A CHAIR

[76] Inventor: Hsiu-Hsueh Wu, P.O. Box 63-247, Taichung, Taiwan

[21] Appl. No.: 09/325,051

[22] Filed: Jun. 3, 1999

[51] Int. Cl.[7] .................................................. A47C 7/54
[52] U.S. Cl. .................................. 297/411.28; 297/440.1; 297/463.1; 403/260; 403/408.1
[58] Field of Search .................... 297/411.27, 411.28, 297/411.44, 440.1, 463.1, 411.29; 403/258, 260, 408.1

[56] References Cited

U.S. PATENT DOCUMENTS

| | | | |
|---|---|---|---|
| 3,115,367 | 12/1963 | Gariepy | 297/411.28 X |
| 5,135,341 | 8/1992 | Leyder | 403/408.1 X |
| 5,573,898 | 11/1996 | Ranai et al. | 297/411.27 |
| 5,888,012 | 3/1999 | Nygren, Jr. et al. | 403/408.1 X |
| 5,961,243 | 10/1999 | Michaluk, III | 403/260 |

*Primary Examiner*—Peter R. Brown
*Attorney, Agent, or Firm*—Alan Kamrath Oppenheimer Wolff & Donnelly LLC

[57] ABSTRACT

A connecting arrangement is provided for connecting two armrests, a seat, and a backrest of a chair. The backrest includes two connecting tubes extended outward from each of two sides thereof. The seat includes two connecting tubes extended outward from each of two sides thereof. Each connecting tube has a nut embedded therein. Each armrest includes two holes for engaging with the connecting tubes of the backrest and two further holes for engaging with the connecting tubs of the seat. Each hole has a relatively larger inner section for receiving an associated connecting tube and a relatively smaller outer section. A screw is extended through a connecting member embedded in the armrest and the nut.

9 Claims, 4 Drawing Sheets

CONNECTING ARRANGEMENT FOR BACKREST, ARMREST, AND SEAT OF A CHAIR

BACKGROUND OF THE INVENTION

1. Field of the Invention

The present invention relates to a connecting arrangement for the backrest, armrest, and seat of a chair.

2. Description of the Related Art

A typical chair includes a wooden seat and/or a wooden backrest that consumes woods having a limited resource. In addition, the wooden seat or backrest has to be drilled before it is assembled with armrests by metal pieces or iron plates. The processing procedure and assembly are complicated. A further drawback is that the wooden seat and backrest deform as a result of temperature change and thus adversely affect the assembly precision.

FIG. 4 of the drawings illustrates a conventional engagement between an armrest and a chair seat. A sleeve 50 is extended through a hole 71 of a seat 70. A flange 52 is formed on an end of the sleeve 50 that is located on an inner side of the seat 70. A screw 80 is extended through a connecting member 62 embedded in the armrest 60 and a screw hole 51 of the sleeve 50 to secure the armrest 60 and the seat 70 together. The flange 52 provides a primary support for the connection between the armrest 60 and the seat 70. In addition, load of the armrest 60 acts on the flange 52. Thus, the flange 52 wears quickly and thus adversely affects the engaging effect and might result in swaying of the armrest.

The present invention is intended to provide an improved connecting arrangement that mitigates and/or obviate the above problems.

SUMMARY OF THE INVENTION

It is a primary object of the present invention to provide an improved connecting arrangement for the armrest, backrest, and seat of a chair.

In accordance with a first aspect of the invention, a connecting arrangement is provided for connecting an armrest and a backrest of a chair. The backrest includes at least one connecting tube extended outward from a side thereof, said at least one connecting tube having a nut embedded therein. The armrest includes at least one hole having a relatively larger inner section for receiving said at least one connecting tube and a relatively smaller outer section. The armrest further includes a connecting member embedded therein. A fastener is extended through the connecting member and the nut.

The backrest is preferably an integrally formed member. The backrest may include a plurality of reinforcing blocks formed thereon to improve the structural strength.

In accordance with a second aspect of the invention, a connecting arrangement is provided for connecting an armrest and a seat of a chair. The seat includes at least one connecting tube extended outward from a side thereof, said at least one connecting tube having a nut embedded therein. The armrest includes at least one hole having a relatively larger inner section for receiving said at least one connecting tube and a relatively smaller outer section. The armrest further includes a connecting member embedded therein. A fastener is extended through the connecting member and the nut. The seat is preferably an integrally formed member.

In a preferred embodiment of the invention, a connecting arrangement is provided for connecting two armrests, a backrest, and a seat of a chair. The seat includes two first connecting tubes extended outward from each of two sides thereof. The backrest includes two second connecting tubes extended outward from each of two sides thereof. Each first connecting tube has a first nut embedded therein. Each second connecting tube has a second nut embedded therein. Each armrest includes two first holes and two second holes. Each first hole has a relatively larger inner section for receiving an associated first connecting tube and a relatively smaller outer section. Each armrest further includes a connecting member embedded therein. A first fastener is extended through the connecting member and an associated first nut, and a second fastener is extended through an associated second nut.

By such an arrangement, the engagement between the armrests and the backrest (or seat) is reliable such that swaying of the armrest is avoided even after a term of use. In addition, assembly of the armrest to the backrest and the seat is simple and easy. The backrest and the seat are integrally formed by molding injection, respectively. No drilling or riveting is required in the backrest and the seat. Neither metal piece nor iron plate is required in the assembly procedure. Bolts or screws are the only elements required and the assembly precision is reliable. The deformation problem of the wooden seat and backrest as a result of temperature change is avoided.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
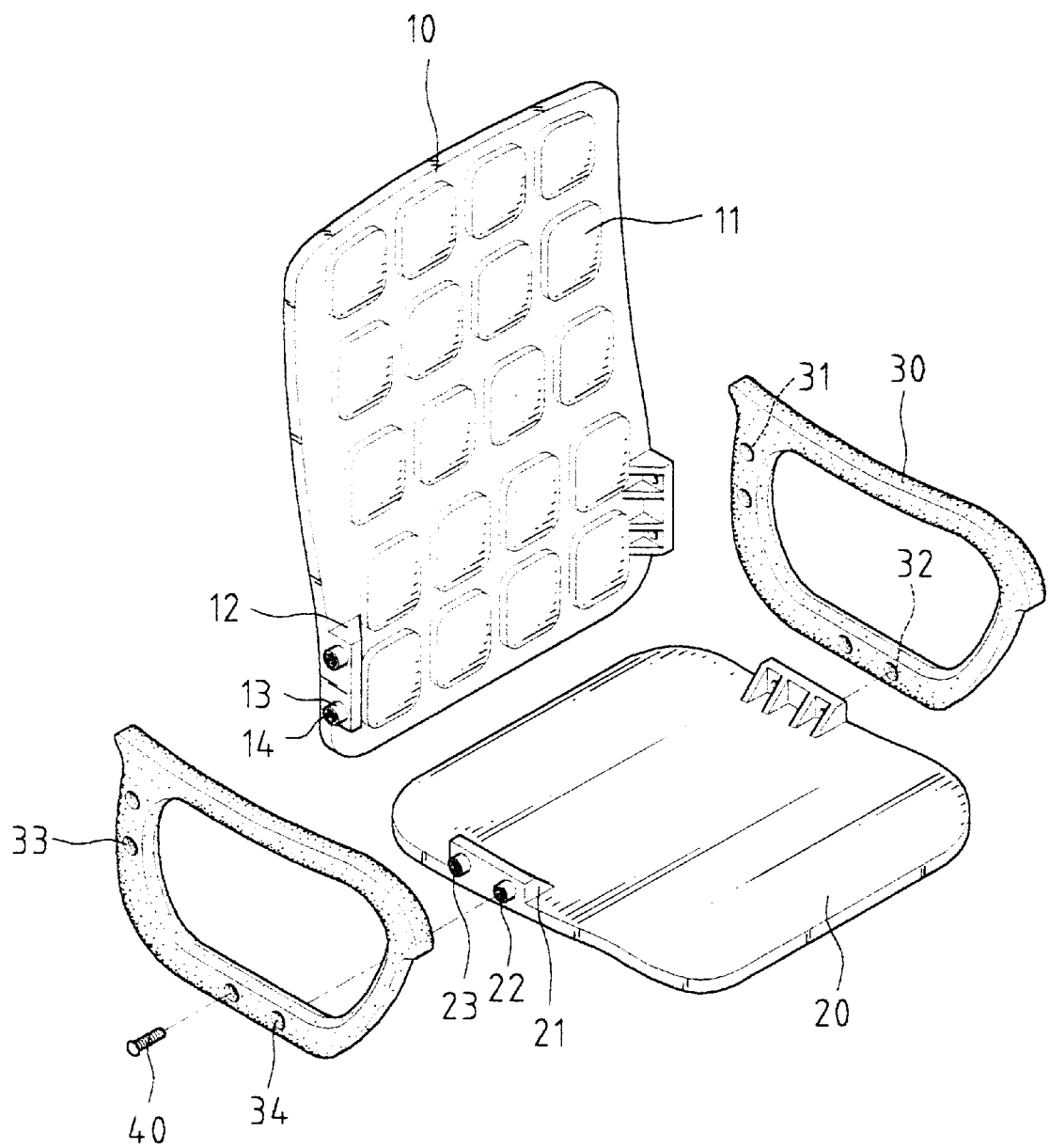
FIG. 1 is an exploded perspective view of two armrests, a backrest, and a seat of a chair with a connecting arrangement in accordance with the present invention.
Figure 2:
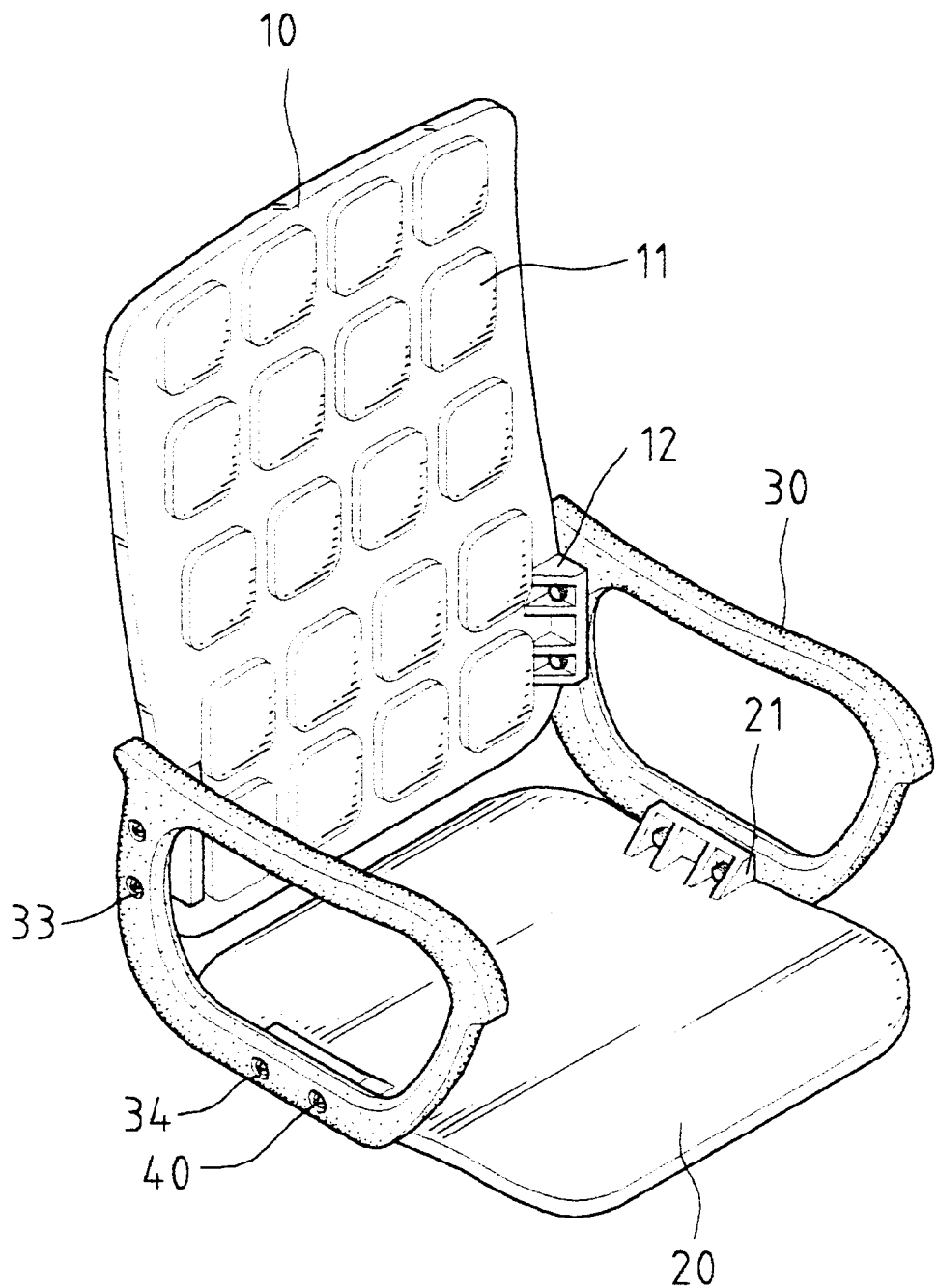
FIG. 2 is a perspective view of the armrests, the backrest, and the seat after assembly.
Figure 3:
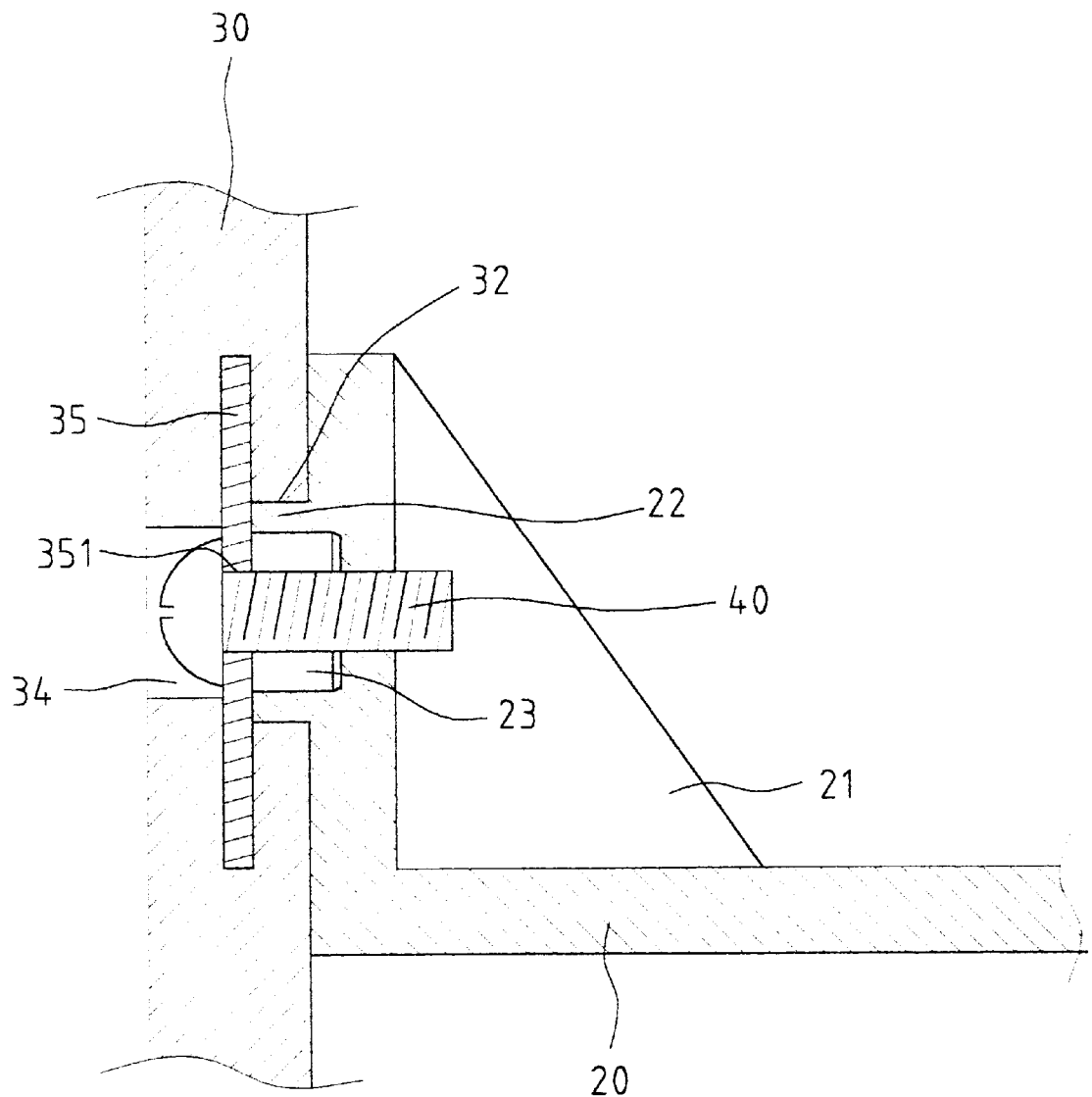
FIG. 3 is a sectional view illustrating engagement between an armrest and a seat in accordance with of the present invention.
Figure 4:
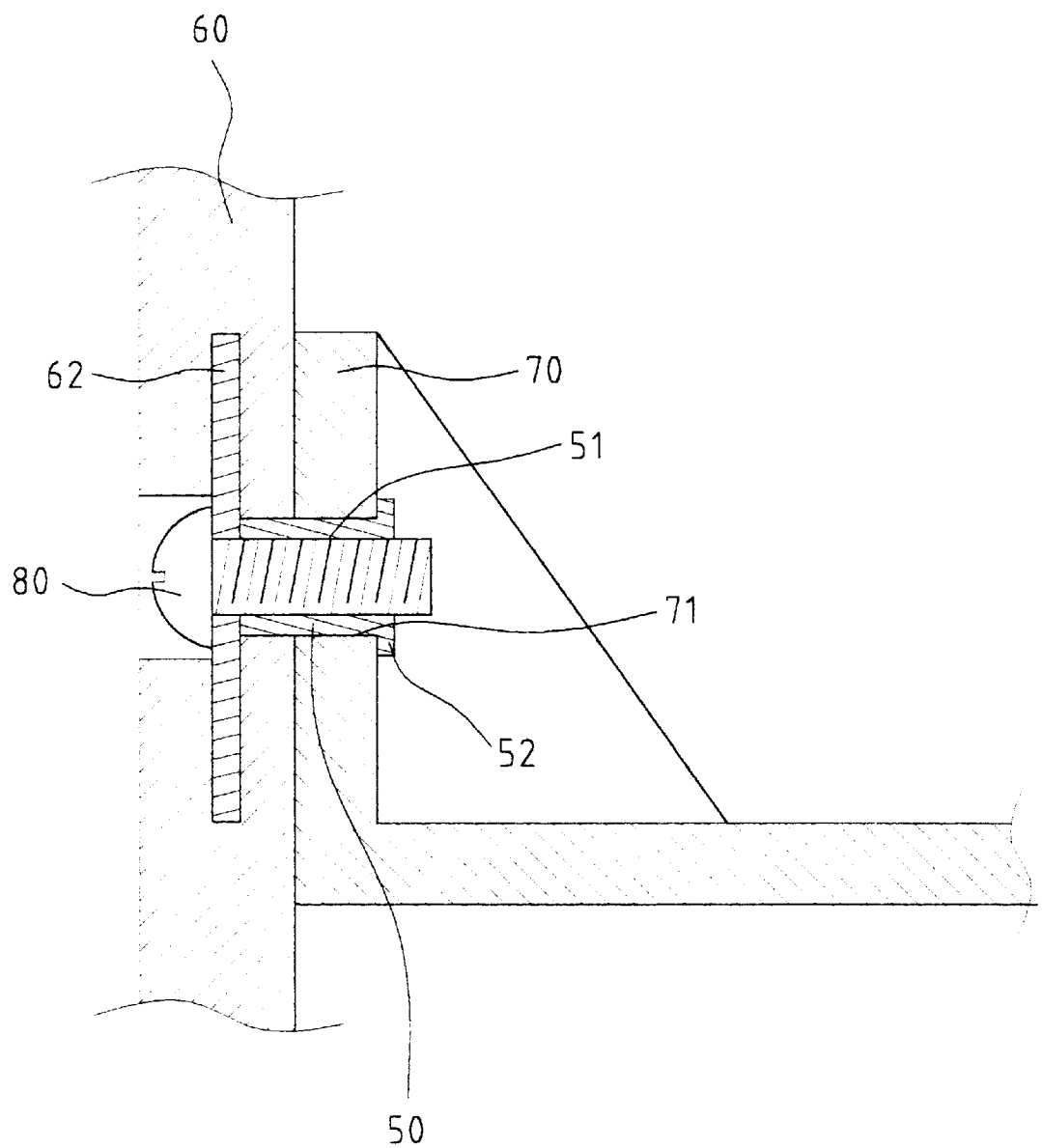
FIG. 4 is a sectional view illustrating a conventional connection between an armrest and a seat.

Referring to FIGS. 1 through 3, a chair in accordance with the present invention generally includes a backrest 10, a seat 20, and two armrests 30. The backrest 10 is preferably an integral member formed by molding injection. The backrest 10 includes a number of reinforcing blocks 11 formed on a face thereof to improve the structural strength. A fixing means 12 is integrally formed on each of two sides of the backrest 10. The fixing means 12 is preferably trapezoid and includes two outwardly extending connecting tubes 13, each connecting tube 13 including a nut 14 embedded therein.

The seat 20 is preferably an integral member formed by molding injection. A fixing means 21 is integrally formed on each of two sides of the seat 20. The fixing means 21 is preferably trapezoid and includes two outwardly extending connecting tubes 22, each connecting tube 22 including a nut 23 embedded therein.

The armrests 30 are mounted to both sides of the seat 20, respectively. Each armrest 30 includes two first holes for engaging with the seat 20 and two second holes for engaging with the backrest 10. Referring to FIGS. 1 and 3, each first hole includes a relatively larger section 32 for receiving the associated connecting tube 22 on the associated side of the seat 20. In assembly, as can be seen from FIG. 3, the armrest 30 is attached to the associated side of the seat 20, and a fastener (a bolt or screw 40) is extended through a hole 351 of a connecting member 35 embedded in the armrest 30 and the nut 23 embedded in the connecting tube 22. The second holes are arranged identical to the first holes, and assembly of the armrest 30 to the backboard 10 is identical to that shown in FIG. 3.

It is appreciated that the engagement between the armrests and the backrest (or seat) is reliable such that swaying of the armrest is avoided even after a term of use. In addition, assembly of the armrest to the backrest and the seat is simple and easy. The backrest and the seat are integrally formed by molding injection, respectively. No drilling or riveting is required in the backrest and the seat. Neither metal piece nor iron plate is required in the assembly procedure. Bolts or screws are the only elements required and the assembly precision is reliable. The deformation problem of the wooden seat and backrest as a result of temperature change is avoided.

Although the invention has been explained in relation to its preferred embodiment, it is to be understood that many other possible modifications and variations can be made without departing from the spirit and scope of the invention as hereinafter claimed.

What is claimed is:

1. A connecting arrangement which connects an armrest and a backrest of a chair, the backrest including at least one connecting tube extended outward from a side thereof, said at least one connecting tube having a nut embedded therein, the armrest including at least one hole having a relatively larger inner section for receiving said at least one connecting tube and a relatively smaller outer section, the armrest further including a connecting member embedded therein, and a fastener being extended through the connecting member and the nut.

2. The connecting arrangement as claimed in claim 1, wherein the backrest is an integrally formed member.

3. The connecting arrangement as claimed in claim 1, wherein the backrest includes a plurality of reinforcing blocks formed thereon.

4. A connecting arrangement which connects an armrest and a seat of a chair, the seat including at least one connecting tube extended outward from a side thereof, said at least one connecting tube having a nut embedded therein, the armrest including at least one hole having a relatively larger inner section for receiving said at least one connecting tube and a relatively smaller outer section, the armrest further including a connecting member embedded therein, and a fastener being extended through the connecting member and the nut.

5. The connecting arrangement as claimed in claim 4, wherein the seat is an integrally formed member.

6. A connecting arrangement which connects two armrests, a backrest, and a seat of a chair, the seat including two first connecting tubes extended outward from each of two sides thereof, the backrest including two second connecting tubes extended outward from each of two sides thereof, each said first connecting tube having a first nut embedded therein, each said second connecting tube having a second nut embedded therein, each said armrest including two first holes and two second holes, each said first hole having a relatively larger inner section for receiving an associated said first connecting tube and a relatively smaller outer section, each said armrest further including a connecting member embedded therein, a first fastener being extended through the connecting member and an associated said first nut, and a second fastener being extended through an associated said second nut.

7. The connecting arrangement as claimed in claim 6, wherein the backrest is an integrally formed member.

8. The connecting arrangement as claimed in claim 6, wherein the backrest includes a plurality of reinforcing blocks formed thereon.

9. The connecting arrangement as claimed in claim 6, wherein the seat is an integrally formed member.

* * * * *